Feb. 8, 1955  R. U. LEMIEUX  2,701,794
GLUCOUSTILIC ACID AND PROCESS THEREFOR
Filed April 9, 1952
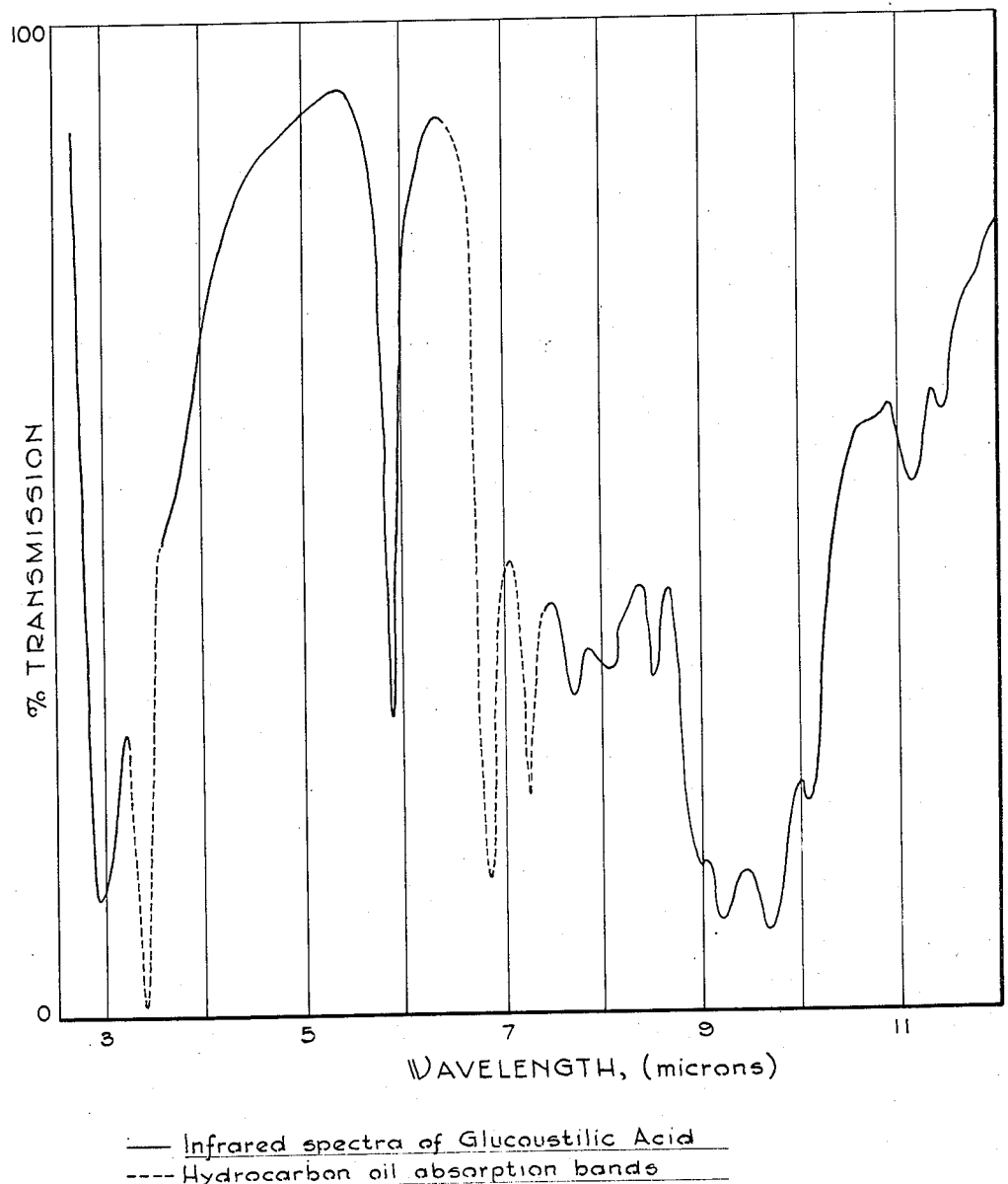
—— Infrared spectra of Glucoustilic Acid
---- Hydrocarbon oil absorption bands
INVENTOR.
Raymond U. Lemieux
BY
Alex. E. MacRae
Attorney.

United States Patent Office 2,701,794
Patented Feb. 8, 1955

2,701,794

GLUCOUSTILIC ACID AND PROCESS THEREFOR

Raymond U. Lemieux, Saskatoon, Saskatchewan, Canada, assignor to National Research Council, Ottawa, Ontario, Canada, a body corporate of Canada Application April 9, 1952, Serial No. 281,454

4 Claims. (Cl. 260—210)

This invention relates to glucoustilic acid and salts thereof and to the preparation of the same.

Ustilagic acid has been produced by growing a culture of the organism *Ustilago zeae* under submerged aseptic aeration in an aqueous medium having a pH between 4 and 7 and containing a soluble carbohydrate, a source of assimilable nitrogen and essential mineral salts at temperatures of 24° to 34° C.

It has now been found that useful new products can be produced from this ustilagic acid and the object of the present invention is to provide a method for the commercial production of such products, glucoustilic acid, and salts thereof. Glucoustilic acid can be transformed to other valuable compounds as described hereafter. Its alkali salts possess useful detergent properties.

Glucoustilic acid may be prepared by direct treatment of the culture mixture containing ustilagic acid or by treatment of the ustilagic acid after its separation from the culture mixture. The processes are equivalent except that treatment of pure ustilagic acid yields a glucoustilic acid preparation of greater purity than is obtained by the direct treatment of the culture mixture. The preparation of crude glucoustilic acid by the direct treatment of the culture mixture containing ustilagic acid is preferred for most purposes since the method obviates the isolation of ustilagic acid.

In accordance with the method of the invention there is added to the culture mixture or the separated ustilagic acid suspended in water a strong base such as sodium, potassium and barium hydroxide. In practice, to insure complete reaction, the alkali is added in such amounts that after reaction is complete the reaction mixture is strongly alkaline. The mixture may be allowed to stand at room temperature for two hours under agitation to saponify the ustilagic acid or it may be heated to effect the saponification in a shorter time. The residual solids, if any, are removed by filtration or centrifugation. Upon the addition of a strong mineral acid, such as hydrochloric, sulphuric and nitric, to the clear filtrate, glucoustilic acid precipitates and is removed by filtration. It may be washed with water and upon drying lyophically yields a finely divided white powder. Air drying yields a hard horny material which is readily ground to a powder.

Glucoustilic acid prepared from purified isolated ustilagic acid is a white amorphous powder, soluble in aqueous alkali, methanol and pyridine, very sparingly soluble in water and ethanol, and insoluble in ether, chloroform and benzene. The levorotatory material $[\alpha]_D -11°$ in methanol, contains 54.2–54.6% carbon, 8.4–8.6% hydrogen and the balance is oxygen. Titration with alkali reveals a neutralization equivalent of 616±4. The infrared absorption curve for the material in the 2.8 to 12 micron region is shown in Figure I of the accompanying drawing. The characteristic absorption bands are at the following wavelengths expressed in microns of 2.95, 5.87, 7.70, 8.10, 8.55, 9.00, 9.20, 9.70, 10.06, 11.5, 11.45.

The glocoustilic acid prepared from purified ustilagic acid contains 58.0 to 58.5% D-glucose, a glucose content which corresponds to two glucose residues per neutralization equivalent of glucoustilic acid. A process for the removal of the glucose residues to yield ustilic acid is the subject of application, Serial Number 281,451 of even date herewith. The composition termed ustilic acid is valuable as starting material for the preparation of perfume bases. Although the process of this invention, when applied to fermentation cultures containing ustilagic acid, yields a crude product, the crude brownish-coloured glucoustilic acid preparation which is obtained is suitable as starting material for the preparation of the ustilic acid composition.

The following examples are illustrative of this procedure.

(1) A culture mixture containing ustilagic acid was rendered strongly alkaline by the addition of sodium hydroxide. In practice, about 4 gm. of sodium hydroxide is required per liter of fermentation mixture. After stirring at room temperature for two hours, the residual culture solids were removed by centrifugation. The soap-like centrifugate was made acid to Congo red indicator by the addition of sulphuric acid to precipitate the glucoustilic acid. After standing at room temperature for one day, the precipitated glucoustilic acid was collected by centrifugation or filtration and washed with water. Drying in air or in a forced draft oven at about 50° C. yields a darkly coloured horn-like material which is crude glucoustilic acid.

(2) A culture mixture containing ustilagic acid was rendered alkaline by an excess of sodium hydroxide. The mixture was stirred for about two hours at 30° C. and the residual culture solids were removed by filtration. The filtrate was made acid to Congo red by the addition of sulphuric acid. After standing at room temperature for one day the precipitated glucoustilic acid was gathered by filtration or centrifugation. To form sodium glucoustilate, the acid was neutralized with 0.3 N sodium hydroxide, the solution was filtered and dried to yield a light white powder.

(3) 100 gms. of ustilagic acid was dissolved by heating at 100° C. with 1300 ml. of 0.1 N sodium hydroxide solution for 30 minutes. The solution was poured with stirring into 2 liters of water containing 13 ml. of concentrated hydrochloric acid. Glucoustilic acid precipitated and was removed by filtration. It was washed three times by stirring with water and filtered. The yield was 77 gm. of amber coloured brittle glucoustilic acid.

The combined filtrates were reduced in vacuo at 40° C. to 700 ml. volume. The solution was extracted with ether. The ether extract was dried over sodium sulphate and evaporated below 40° C. to an oil which was dissolved in 100 ml. of 5% hydrogen chloride in dry methanol. The solution was refluxed for 2 hours, cooled, diluted with 250 ml. of ether and the mixture was poured into 500 ml. of ice water. The ether phase was washed twice with water, dried over sodium sulphate and reduced by evaporation to 17.5 gm. of a yellow oil. Fractional distillation at 15 mm. pressure separated the oil into components, methyl L-3-hydroxyhexanoate, B. P. 98° C. at 15 mm., $[\alpha]_D +28°$ (in chloroform) $n_D^{21}$ 1.428, yield 11.2 gm., and methyl L-3-hyroxyoctanoate, B. P. 125° C. at 15 mm., $[\alpha]_D +24°$ (in chloroform), $n_D^{21}$ 1.434, yield 6.0 gm.

It will be observed that one neutral equivalent of ustilagic acid yields about one neutral equivalent of the water insoluble glucoustilic acid, about ⅔ mole of L-3-hydroxyhexanoic acid and about ⅓ mole of L-3-hydroxyoctanoic acid and the two last mentioned substances are converted to their methyl ester, methyl L-3-hydroxyhexanoate and methyl L-3-hydroxyoctanoate respectively. The latter substances are further characterized by their crystalline derivatives, L-3-hydroxyhexanohydrazide, M. P. 131–132° C. $[\alpha]_D +16°$ (in water), and L-3-hydroxyoctanohydrazide, M. P. 127–128° C., $[\alpha]_D +12°$ (in water).

What is claimed is:

1. A process of producing glucoustilic acid and its salts which comprises treating ustilagic acid with a hydroxide of one of a group consisting of sodium, potassium and barium to dissolve and saponify the acid, removing solids from the solution, stirring the mixture with a strong acid to precipitate glucoustilic acid and separating the precipitated glucoustilic acid.

2. A process as defined in claim 1 wherein the ustilagic acid is treated in the presence of culture solids and media in which it was grown.

3. A process as defined in claim 1 including the steps of extracting the filtrate, after separating the glucoustilic acid, with a water immiscible solvent, being one of a group consisting of ether, benzene and chloroform and separating the solvent to yield a mixture comprising L-3-hydroxyhexanoic acid and L-3-hydroxyoctanoic acid.

4. As a new composition of matter, glucoustilic acid, neutralization equivalent 616±4, soluble in methanol, pyridine and aqueous alkali, only sparingly soluble in water and ethanol and insoluble in ether, benzene and chloroform, which when suspended in a solid state in hydrocarbon oil exhibits characteristic absorptions in the infrared region of the spectrum at the following wavelengths expressed in microns 2.95, 5.87, 7.70, 8.10, 8.55, 9.00, 9.20, 9.70, 10.06, 11.15, 11.45.

No references cited